United States Patent [19]

Sugimoto

[11] Patent Number: 4,694,929
[45] Date of Patent: Sep. 22, 1987

[54] FRAME BODY OF MOTORCYCLES

[75] Inventor: Makoto Sugimoto, Iwata, Japan

[73] Assignee: Sanshin Kogyo Kabushiki Kaisha, Japan

[21] Appl. No.: 820,546

[22] Filed: Jan. 17, 1986

[30] Foreign Application Priority Data

Jan. 18, 1985 [JP] Japan .................................. 60-6746
Mar. 14, 1985 [JP] Japan .................................. 60-51097

[51] Int. Cl.$^4$ ............................................. B62K 11/04
[52] U.S. Cl. ................................ 180/311; 280/281 R
[58] Field of Search ....................... 280/281 R, 279; 180/219, 311

[56] References Cited

U.S. PATENT DOCUMENTS 1,998,994  4/1935  Lewis ............................ 280/281 R
2,493,037  1/1950  Simon ............................ 280/281 R
4,548,422  10/1985  Michel et al. .................... 280/281 R
4,585,086  4/1986  Hiramatsu ...................... 280/281 R

FOREIGN PATENT DOCUMENTS 520212  6/1921  France .............................. 180/219
352342  7/1931  United Kingdom ............ 280/281 R
770911  10/1980  U.S.S.R. ........................... 280/281 R Primary Examiner—John A. Pekar
Attorney, Agent, or Firm—Ernest A. Beutler

[57] ABSTRACT

A motorcycle and specifically an improved light weight, high strength frame for such a vehicle. The frame is made up of a head pipe and main frame members which have a box section and interlocking relationship for affixing the main frame members to the head pipe.

13 Claims, 10 Drawing Figures

FRAME BODY OF MOTORCYCLES

BACKGROUND OF THE INVENTION

This invention relates to a frame and body construction for motorcycles and more particularly to an improved, high strength, light weight frame assembly for motorcycles.

A number of light weight, single rider vehicles, such as motorcycles, are provided with a single steered front wheel. Vehicles of this type normally employ a frame that is a welded up construction and which includes a head pipe that dirigibly supports the front wheel. The remaining frame elements are connected to the head pipe in a wide variety of manners and have different configurations, but most frames employ one or more main tubes that extend rearwardly from the head pipe and which provide the main support for the rider and certain components of the motorcycle.

It is well known that it is desirable to maintain as low a weight as possible for the frame construction so as to make the vehicle more maneuverable, have better performance and for the other reasons associated with the desirability of light weight construction. However, in addition to being light in weight, the frame must be particularly strong so as to absorb all of the loadings which are placed upon it, particularly in the area where the head pipe joins the main tube or tubes. In addition, the joints between the various frame members should be very rigid so as to resist braking upon the severe loadings encountered by this type of vehicle.

It is, therefore, a principal object of this invention to provide an improved frame construction for a vehicle such as a motorcycle.

It is yet a further object of this invention to provide an improved, high strength, light weight frame for vehicles having only a single dirigible front wheel.

It is a yet further object of this invention to provide an improved and strengthened joint construction for the frames of such vehicles.

SUMMARY OF THE INVENTION

A first feature of this invention is adapted to be embodied in a frame construction for a vehicle having only a single dirigible front wheel comprising a head pipe adapted to dirigibly support the front wheel and a main frame member affixed at its forward end to the head pipe and extending rearwardly therefrom. In accordance with this feature of the invention, the main frame member comprises a box section member.

Another feature of the invention is also adapted to be embodied in a frame construction having a head pipe that dirigibly supports a single steered front wheel and a main frame member that is affixed at its forward end to the head pipe and which extends rearwardly therefrom. In accordance with this feature of the invention, interlocking means are provided on the head pipe and on the main frame member for locating and retaining these two members together.

DETAILED DESCRIPTION OF THE PREFERRED EMBODIMENTS

Figure 1:
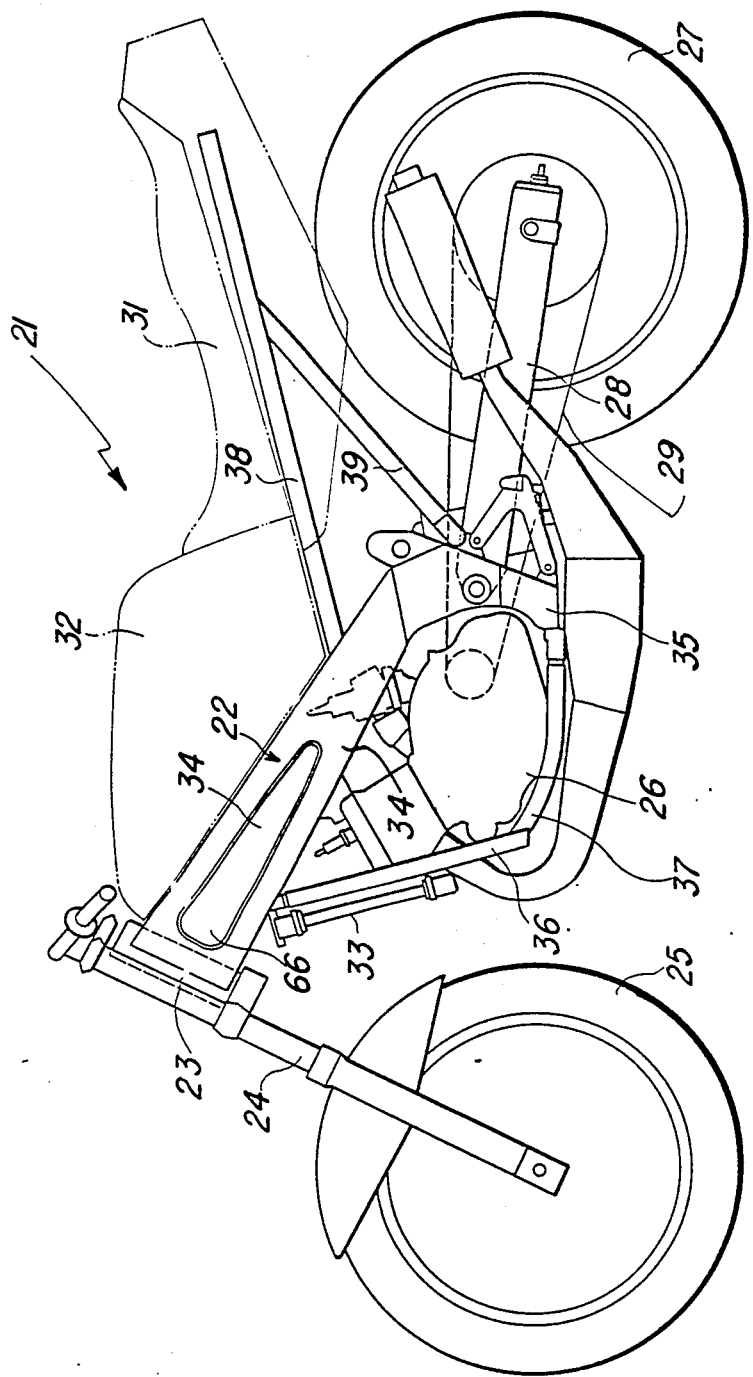
FIG. 1 is a side elevational view of a motorcycle constructed in accordance with this invention with certain components shown in phantom.

Referring now in detail to the drawings and first to FIG. 1, a motorcycle contructed in accordance with an embodiment of this invention is identified generally by the reference numeral 21. The motorcycle 21 includes a frame assembly, which incorporates the embodiment of the invention and which is identified generally by the reference numeral 22. The motorcycle frame 22 is of a welded up construction, as will be described, and includes a main pipe 23 that dirigibly supports a front fork 24 which, in turn, journals a front wheel 25 in a known manner.

A power plant, indicated generally by the reference numeral 26 and which is comprised of an internal combustion engine and combined crankcase, transmission assembly, is supported in a suitable manner in the frame assembly 22. A rear wheel 27 is rotatably journaled at the rear end of a trailing arm assembly 28 that is, in turn, pivotally supported upon the frame 22 in a known manner. The rear wheel 27 is driven by the power plant 27 by means including a chain drive 29.

A seat 31 is mounted on the frame 22 and is positioned rearwardly of a fuel tank 32 which is also carried by the frame assembly 22. The engine of the power plant 26 may be in part water cooled and, for this purpose, a cooling radiator 33 is carried by the frame assembly 22 forwardly of the power plant 26.

Referring now additionally to FIGS. 2, 3, 4 and 8, in addition to the head pipe 23, the frame 22 includes a pair of main frame members 34 which are connected at their forward ends to the head pipe 23 and which extend generally rearwardly and downwardly therefrom. The main frame members 34 are connected to each other at their rear ends by means of a casting 35. The casting 35, main frame members 34 and head pipe 23 are preferably formed from a light weight material such as aluminum or an aluminum alloy. In addition, the frame assembly 22 includes a pair of down tubes 36 that are connected at their upper ends to the underside of the main frame members 34 and at their lower ends to the casting 35 by means of tubes 37. These down tubes 36 and tubes 37 may also be formed of aluminum.

A pair of seat rails 38 are affixed at their forward ends to respective of the main frame members 34 and extend rearwardly. Toward the rar end of the seat rails 38, there are provided seat pillar rails 39 the extend between the seat rails 38 and the casting 35 so as to support the rear end of the seat rails 38. The seat 31 is supported on the seat rails 38 and the fuel tank 32 is supported on the seat rails 38 and the main frame members 34. These supporting connections may be of any known type.

Referring now primarily to FIGS. 3 through 7, the construction and formation of the head pipe 23 will be described. As has been noted, the head pipe 23 may be formed preferably from aluminum and may be made as either a sand casting, a pressure casting, a forging or an extrusion. The head pipe 23 has a generally cylindrical configuration and is formed with a pair of forwardly facing lugs 41 that may be employed for journaling the front fork 24 for its steering movement. In addition, a pair of outstanding lugs 42 and 43 are formed on opposite sides of the head pipe 23. These lugs have respective forwardly facing edges 44 and 45 and rearwardly facing edges 46 and 47.

There is formed a rearwardly facing lug 48 that has a pair of sidewardly extending projections 49 and 51 that form respective lug recesses 52 and 53. The recesses 52 and 53 face the lug surfaces 46 and 47, respectively. As may be best seen in FIGS. 5 and 6, the lugs 44, 45 and 48 taper downwardly so that they are wider at their lower edges than at their upper edges.

Figure 7:
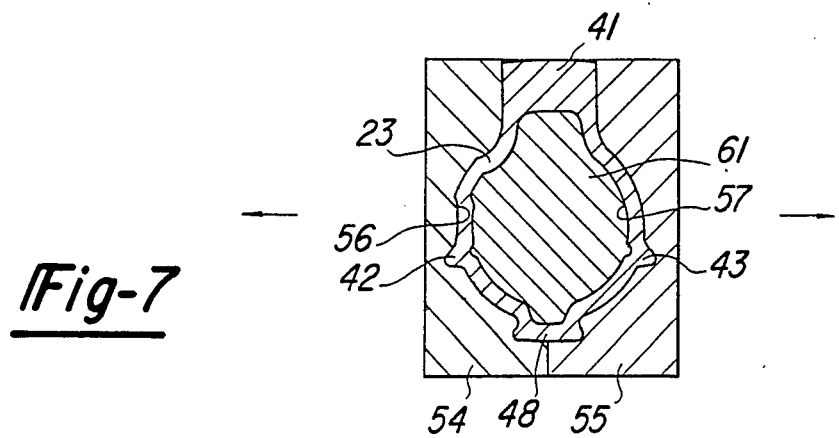
FIG. 7 is a view showing how the head pipe may be formed.

FIG. 7 illustrates how the head pipe 23 may be formed by means of a casting process. A pair of casting dies 54 and 55 are provided with respective cavities 56 and 57 that are shaped so as to configure the outer periphery of the head pipe 23. For this purpose, the edges 46 and 47 and rear faces 58 and 59 of the lugs 44, 45 and 48 are inclined at an angle so as to offer relief for the opening of the casting dies 54 and 55. In addition, a suitable core 61 is provided to form the cavity of the head pipe 23.

Figure 2:
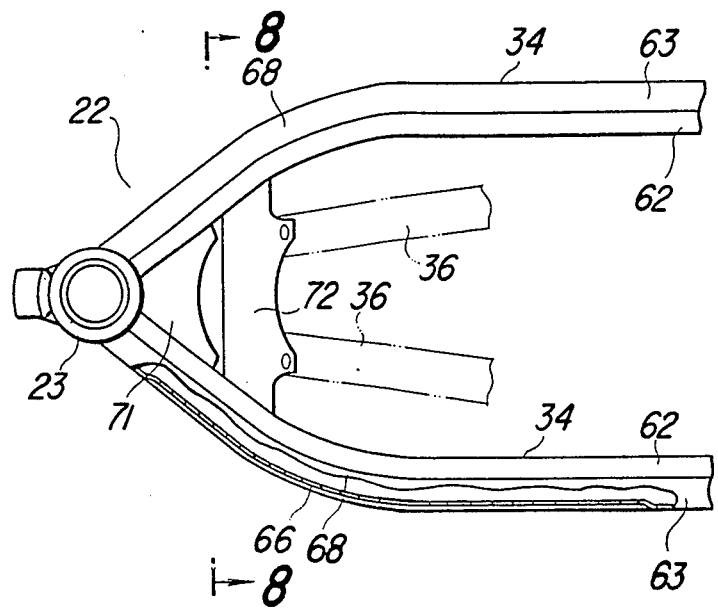
FIG. 2 is a top plan view looking generally in the direction of the arrow 2 in FIG. 3 and showing the frame construction only.
Figure 3:
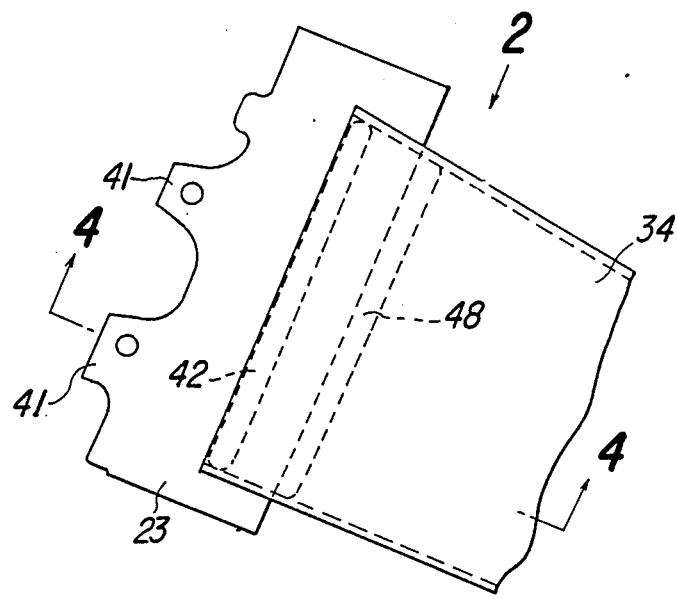
FIG. 3 is an enlarged side elevational view of the connection between the head pipe and the main pipe.
Figure 4:
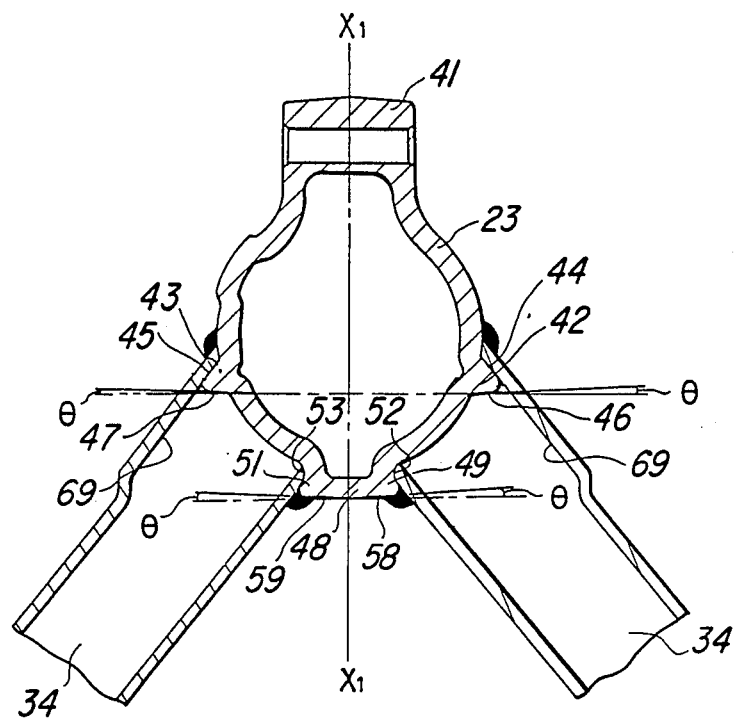
FIG. 4 is a cross-sectional view taken along the line 4—4 of FIG. 3.
Figure 5:
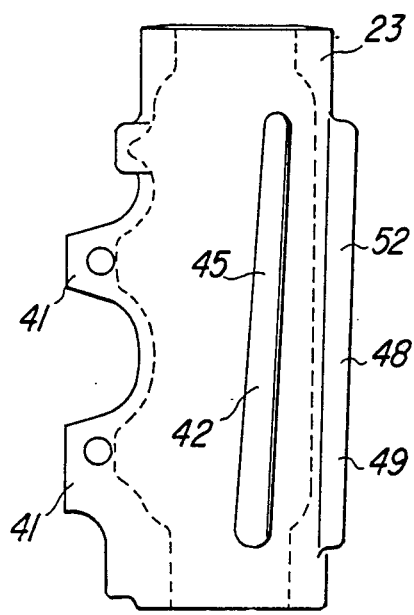
FIG. 5 is a side elevational view of the head pipe alone.
Figure 6:
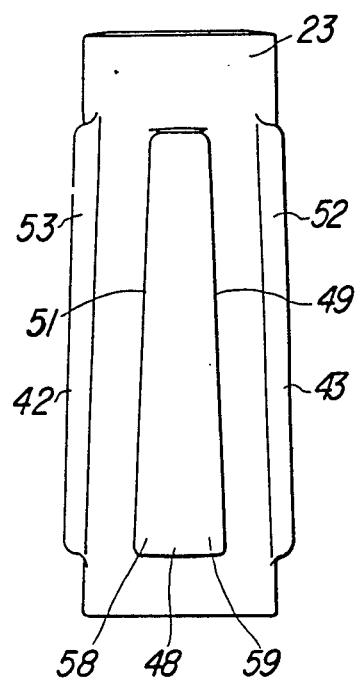
FIG. 6 is a rear elevational view of the head pipe.
Figure 8:
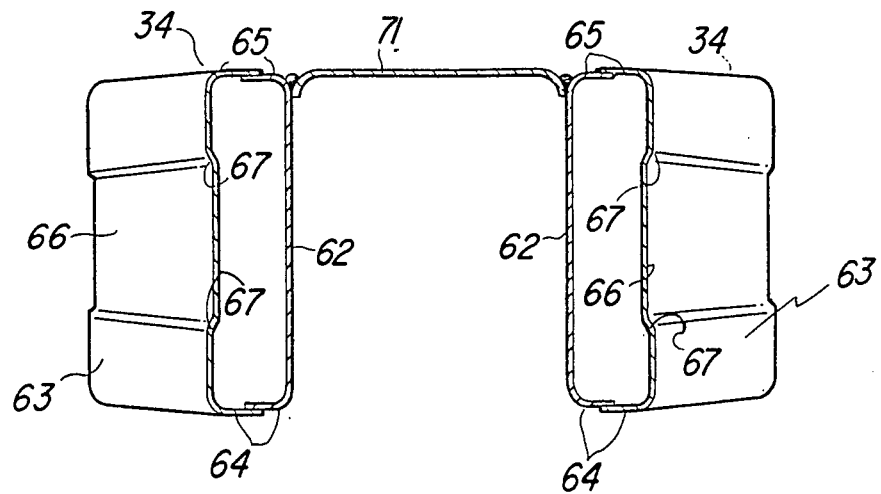
FIG. 8 is a cross-sectional view taken along the line 8—8 of FIG. 2 on an enlarged scale.

Referring now primarily to FIGS. 1, 2 and 8, the construction of the main frame members 34 will be described. Each main frame member 34 is formed preferably from aluminum and is made up of a generally box section comprised of an inner piece 62 and an outer piece 63. The inner and outers pieces 62 and 63 have overlapping flanges 64 and 65 at their respective upper and lower ends so as to afford an area where the inner and outer pieces 62 and 63 may be afixed together as by welding. To provide reinforcing, the outer pieces 63 are formed with embossed or recessed areas 66 that are joined to the remaining faces by arcuate faces 67. As may be best seen in FIG. 2, the main frame members 34 extend generally parallel to each other from the casting 35 and then have curved sections 68 through which the recesses 66 extend and which form forwardly facing parts that are joined to the head pipe 23 in a manner best understood by reference to FIG. 4.

The forward portion of the main pipes 34 are provided with somewhat enlarged openings 69 that are sized and shaped so as to be received within the pockets 52 and 53 and engage the outer surfaces 44 and 45 of the lugs 42 and 43. Because of this configuration, the welds between the head pipe and the main frame members 34 may be easily made and furthermore there will be an interlocking relationship that adds to the rigidity of the overall frame construction.

For further reinforcing the construction of the frame 22, a gusset plate 71 is welded to the forward upper edges of the main frame members 34 and the rearward surface of the head pipe 23. Thus, it should be readily apparent that an extremely rigid frame construction is formed and yet that the frame may have a very light weight due to its hollow shape and the fact that it is formed from aluminum.

A further reinforcing plate 72 (FIG. 2) is welded to the underside of the main frame members 34 adjacent the head pipe 23. The down tubes 36 are affixed, as by welding, to the plate 72.

Figure 9:
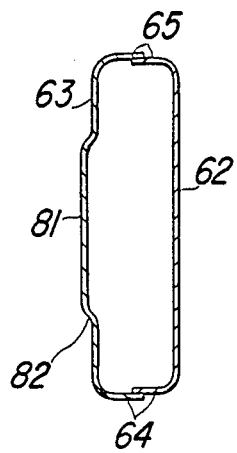
FIG. 9 is a cross-sectional view showing an alternative embodiment for the construction of the main frame members.

In the embodiment thus far described, the main frame members 34 were reinforced by recesses 66 formed in the outer members 63 adjacent the head pipe 23. A similar reinforcing effect may be achieved by providing an outwardly extending projection 81 in the outer main frame piece 82 as shown in FIG. 9. Since the remainder of the construction of this embodiment is the same as the previously described embodiment, common parts have been identified by the same reference numerals and will not be described again.

Figure 10:
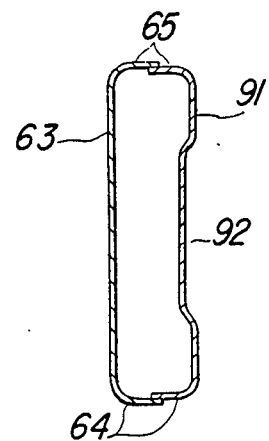
FIG. 10 is a cross-sectional view, in part similar to FIG. 9, showing another embodiment.

FIG. 10 shows a still further reinforcing method. In this embodiment, the inner main frame member 91 is reinforced by providing it with a recessed area 92 adjacent the head pipe 23. In other regards, this embodiment is the same as the previously described embodiments and, for that reason, common parts have been identified by the same reference numerals. A still further reinforcement method may be employed by providing the inner main frame member with an outwardly extending projection or, alternatively, both members could be provided with either reinforcing projections or recesses.

It should be readily apparent from the foregoing description that an extremely light weight and yet rigid frame construction for a vehicle having a dirigible front wheel such as a motorcycle has been disclosed. Although several embodiments of the invention have been illustrated and described, various changes and modifications may be made without departing from the spirit and scope of the invention, as defined by the appended claims.

I claim:

1. A frame construction for a vehicle having only a single dirigible front wheel comprising a head pipe adapted to dirigibly support said front wheel and a main frame member affixed at its forward end to said head pipe and extending rearwardly therefrom, said main frame member comprising a box section member, made up of a pair of generally C-shaped pieces having overlapping flanges affixed to each other, said C-shaped pieces tapering in height from said head pipe to the rear in a decreasing manner.

2. A frame construction for a vehicle as set forth in claim 1 wherein the main frame member and the head pipe are formed from aluminum.

3. A frame construction for a vehicle as set forth in claim 1 wherein the main frame member is formed with an embossed area on at least one of its surfaces for reinforcing.

4. A frame construction for a vehicle as set forth in claim 1 wherein the main frame member is affixed at its rear end to a casting that forms a pivotal support for a rear wheel supporting trailing arm.

5. A frame construction for a vehicle as set forth in claim 1 wherein the head pipe and main frame member are interlocked together.

6. A frame construction for a vehicle as set forth in claim 5 wherein the head pipe is formed with lugs to form the interlocking relationship to the main frame member and the main frame member is affixed to the head pipe by welds formed along said lugs.

7. A frame construction for a vehicle as set forth in claim 1 wherein there are a pair of main frame members affixed to and extending rearwardly from the head pipe in spaced relationship.

8. A frame construction for a vehicle as set forth in claim 7 further including a gusset plate affixed to the forward ends of the main frame members and the head pipe.

9. A frame construction for a vehicle as set forth in claim 8 wherein the main frame member is formed with an embossed area on at least one of its surfaces for reinforcing.

10. A frame construction for a vehicle as set forth in claim 9 wherein the main frame member is affixed at its rear end to a casting that forms a pivotal support for a rear wheel supporting trailing arm.

11. A frame construction for a vehicle having only a single dirigible front wheel comprising a head pipe adapted to dirigibly support said front wheel, and a box section main frame member affixed at its forward end to said head pipe and extending rearwardly therefrom, said head pipe having a pair of outwardly extending lugs engaging surfaces of said main frame member for locating said main frame member and said head pipe to each other and means including said lugs for affixing said main frame member and said head pipe to each other.

12. A frame construction for a vehicle as set forth in claim 11 wherein the main frame member and the head pipe are formed from aluminum and are welded to each other.

13. A frame construction for a vehicle as set forth in claim 12 further including means for pivotally journaling a rear wheel suspending trailing arm at the rear end of the main frame member.

* * * * *